(12) United States Patent
Croxford et al.

(10) Patent No.: US 9,349,156 B2
(45) Date of Patent: May 24, 2016

(54) ADAPTIVE FRAME BUFFER COMPRESSION

(71) Applicant: ARM LIMITED, Cambridge (GB)

(72) Inventors: Daren Croxford, Cambridge (GB); Simon Jones, Cambridge (GB); Oskar Flordal, Lund (SE)

(73) Assignee: ARM Limited, Cambridge (GB)

( * ) Notice: Subject to any disclaimer, the term of this patent is extended or adjusted under 35 U.S.C. 154(b) by 215 days.

(21) Appl. No.: 13/898,510

(22) Filed: May 21, 2013

(65) Prior Publication Data

US 2013/0314429 A1 Nov. 28, 2013

Related U.S. Application Data

(63) Continuation-in-part of application No. 12/588,461, filed on Oct. 15, 2009.

(30) Foreign Application Priority Data

Sep. 25, 2009 (GB) .................................. 0916924.4

(51) Int. Cl.
*G06T 9/00* (2006.01)
*G06T 1/60* (2006.01)
(Continued)

(52) U.S. Cl.
CPC *G06T 1/60* (2013.01); *G09G 5/393* (2013.01); *G09G 5/391* (2013.01); *G09G 5/395* (2013.01); *G09G 2330/021* (2013.01); *G09G 2340/02* (2013.01)

(58) Field of Classification Search
CPC .... G06F 2212/40; G06F 2212/401–2212/403; G06F 8/4432–8/4434
USPC .................................................. 382/263–264
See application file for complete search history.

(56) References Cited

U.S. PATENT DOCUMENTS

| 5,181,131 A | 1/1993 | Yamazaki et al. |
| 5,241,656 A | 8/1993 | Loucks et al. |

(Continued)

FOREIGN PATENT DOCUMENTS

| CN | 1834890 | 9/2006 |
| CN | 101116341 | 1/2008 |

(Continued)

OTHER PUBLICATIONS

Hojun Shim, Naehyuck Chang, and Massoud Pedram, "A Compressed Frame Buffer to Reduce Display Power Consumption in Mobile Systems", Design Automation Conference, 2004. Proceedings of the ASP-DAC 2004. Asia and South Pacific, Jan. 27-30, 2004, p. 819-824.*

(Continued)

*Primary Examiner* — Weiming He
(74) *Attorney, Agent, or Firm* — Nixon & Vanderhye P.C.

(57) ABSTRACT

Image data is subject to compression and decompression when it is respectively written to and read from a frame buffer. If a portion of the image data is identified as static (subject to less than a threshold amount of change for greater than a threshold time), then compression control parameters used for compression of that portion of the image are adjusted so as to increase the compression ratio achieved, hold the degree of lossiness substantially constant and increase the energy consumed while compressing that portion. The increased energy consumption during this high compression ratio compression is likely compensated for by a reduction in energy subsequently consumed when writing that frame-buffer image data to the frame buffer and reading that frame-buffer image data multiple times from the frame buffer. The compression characteristics varied may be to increase the block size used in the compression. Other variations in compression applied may be to change from single-pass compression to multi-pass compression, switch compression on and off altogether, or reorder the data when it has been compressed so as to match the order it will be read and so achieve support for longer read burst.

22 Claims, 6 Drawing Sheets (51) Int. Cl.
  G09G 5/393 (2006.01)
  G09G 5/391 (2006.01)
  G09G 5/395 (2006.01)

(56) References Cited

U.S. PATENT DOCUMENTS

| | | | |
|---|---|---|---|
| 5,686,934 | A | 11/1997 | Nonoshita et al. |
| 6,069,611 | A | 5/2000 | Flynn et al. |
| 6,075,523 | A | 6/2000 | Simmers |
| 6,094,203 | A | 7/2000 | Desormeaux |
| 6,101,222 | A | 8/2000 | Dorricott |
| 6,304,606 | B1 | 10/2001 | Murashita et al. |
| 6,825,847 | B1 | 11/2004 | Molnar et al. |
| 7,190,284 | B1* | 3/2007 | Dye et al. ............ 341/51 |
| 7,671,873 | B1 | 3/2010 | Pierini et al. |
| 8,254,685 | B2 | 8/2012 | Greene et al. |
| 8,749,711 | B2 | 6/2014 | Um |
| 2002/0036616 | A1 | 3/2002 | Inoue |
| 2003/0080971 | A1 | 5/2003 | Hochmuth et al. |
| 2004/0141613 | A1* | 7/2004 | Hayashi ............ 380/28 |
| 2005/0168471 | A1 | 8/2005 | Paquette |
| 2005/0285867 | A1 | 12/2005 | Brunner et al. |
| 2006/0050976 | A1 | 3/2006 | Molloy |
| 2006/0152515 | A1 | 7/2006 | Lee et al. |
| 2006/0188236 | A1 | 8/2006 | Kitagawa |
| 2006/0203283 | A1 | 9/2006 | Fujimoto |
| 2007/0005890 | A1 | 1/2007 | Gabel et al. |
| 2007/0083815 | A1 | 4/2007 | Delorme et al. |
| 2007/0146380 | A1 | 6/2007 | Nystad et al. |
| 2007/0188506 | A1 | 8/2007 | Hollevoet et al. |
| 2007/0257925 | A1 | 11/2007 | Brunner et al. |
| 2007/0261096 | A1 | 11/2007 | Lin et al. |
| 2007/0273787 | A1 | 11/2007 | Ogino et al. |
| 2008/0002894 | A1 | 1/2008 | Hayon et al. |
| 2008/0059581 | A1 | 3/2008 | Pepperell |
| 2008/0143695 | A1 | 6/2008 | Juenemann et al. |
| 2009/0033670 | A1 | 2/2009 | Hochmuth et al. |
| 2009/0202176 | A1 | 8/2009 | Hwang et al. |
| 2010/0058229 | A1 | 3/2010 | Mercer |
| 2010/0332981 | A1* | 12/2010 | Lipton et al. ............ 715/716 |
| 2011/0074765 | A1 | 3/2011 | Oterhals et al. |
| 2011/0074800 | A1 | 3/2011 | Stevens et al. |
| 2011/0102446 | A1 | 5/2011 | Oterhals et al. |
| 2012/0092451 | A1 | 4/2012 | Nystad et al. |
| 2012/0176386 | A1 | 7/2012 | Hutchins |
| 2012/0206461 | A1 | 8/2012 | Wyatt et al. |
| 2012/0268480 | A1 | 10/2012 | Cooksey et al. |
| 2012/0293545 | A1 | 11/2012 | Engh-Halstvedt et al. |
| 2013/0067344 | A1 | 3/2013 | Ungureanu et al. |

FOREIGN PATENT DOCUMENTS

| | | |
|---|---|---|
| EP | 1 035 536 A2 | 9/2000 |
| EP | 1 484 737 A1 | 12/2004 |
| JP | 63298485 | 12/1988 |
| JP | 05266177 A | 3/1992 |
| JP | 5-227476 | 9/1993 |
| JP | 5-266177 | 10/1993 |
| JP | 11-328441 | 11/1999 |
| JP | 11355536 | 12/1999 |
| JP | 2004-510270 | 4/2004 |
| JP | 2005-195899 | 7/2005 |
| JP | 2006-268839 | 10/2006 |
| JP | 2007-81760 | 3/2007 |
| JP | 2007-531355 | 11/2007 |
| WO | WO 02/27661 A2 | 4/2002 |
| WO | WO 2005/055582 A2 | 6/2005 |
| WO | WO 2008/026070 | 3/2008 |

OTHER PUBLICATIONS

Chinese First Office Action dated Jul. 31, 2014 in CN 201010294382.5 and English translation, 54 pages.
Chinese First Office Action dated Jun. 11, 2014 in CN 201010294392.9 and English translation, 17 pages.
U.S. Appl. No. 13/435,733, filed Mar. 30, 2012, Cooksey et al.
"XDamage Extension" freedesktop.org, http://www.freedesktop.org/wiki/Software/XDamage/?action=print, 2 pages.
"Creating a polygon shape from a 2d tile array" 3 pages.
EGL (OpenGL), Wikipedia, http://en.wikipedia.org/wiki/EGL_(OpenGL), 2 pages.
"Android-eeepc/base" https://gitorious.org/android-eeepe/base/source/d6ed5def8b8caef511ddclcb8666e6ae59a19c5f:libs/surfaceflinger/DisplayHardware/DisplayHardware.cpp.
"Qt source code" https://qt.gitorious.org/qt/qt/source/427e398a7b7f3345fb4dcbc275b3ea29f211851b:src/gui/kernel/qwidget.cpp.
Final Rejection mailed Jul. 2, 2013 in co-pending U.S. Appl. No. 12/588,459.
Combined Search and Examination Report, Jul. 27, 2012 in GB 1205846.7.
Final Office Action mailed Dec. 3, 2013 in co-pending U.S. Appl. No. 12/588,461.
Office Action mailed Nov. 21, 2013 in co-pending U.S. Appl. No. 12/923,517.
Office Action mailed Nov. 8, 2013 in co-pending U.S. Appl. No. 12/923,518.
Japanese Office Action issued in Japanese Patent Application No. 2010-213509 dated Jun. 23, 2014 (w/ translation)—7 pp.
U.S. Office Action issued in U.S. Appl. No. 13/435,733 dated Jun. 17, 2014.
Office Action mailed Dec. 20, 2013 in co-pending U.S. Appl. No. 13/435,733.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Systems, Aug. 12-14, 2002, Monterey, California, pp. 112-117.
Iyer et al., Energy-Adaptive Display System Designs for Future Mobile Environments, HP Laboratories Palto Alto, Apr. 23, 2003.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
Shim, Low-Power LCD Display Systems, Jun. 2005.
Carts-Powell, Cholesteric LCDs Show Images After Power is Turned Off; OptoIQ, Sep. 1, 1998.
Zhong et al., Energy Efficiency of Handheld Computer Interfaces Limits, Characterization and Practice, Date:?.
Patel et al., Frame Buffer Energy Optimization by Pixel Prediction, Proceedings of the 2005 International Conference on Computer Design, Jun. 2005.
Smalley, ATI's Radeon X800 Series Can Do Transparency AA Too, Sep. 29, 2005.
Esselbach, Adaptive Anti-Aliasing on ATI Radeon X800 Boards Investigated, Oct. 17, 2005.
Digital Visual Interface DVI, Revision 1.0, Digital Display Working Group, Apr. 2, 1999, pp. 1-76.
Ma, OLED Solution for Mobile Phone Subdisplay, Apr. 2003.
U.S. Appl. No. 12/588,459, filed Oct. 15, 2009; Inventor: Oterhals et al.
Shim et al., *A Compressed Frame Buffer to Reduce Display Power Consumption in Mobile Systems*, IEEE, Asia and South Pacific Design Automation Conference (ASP-DAC'04) pp. 1-6.
Shim, *Low-Power LCE Display Systems*, School of Computer Science and Engineering, Seoul National University, Korea.
Chamoli, Deduplication—A Quick Tutorial, Aug. 8, 2008, http://thetoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
United Kingdom Search Report in United Kingdom Application No. GB0916924.4, Jan. 15, 2010.
U.S. Appl. No. 12/923,517, filed Sep. 24, 2010; Inventor: Croxford et al.

(56) References Cited

OTHER PUBLICATIONS

Combined Search and Examination Report, Jan. 26, 2011, in corresponding European Application No. GB1016162.8.
Combined Search and Examination Report, Jan. 26, 2011, in corresponding European Application No. GB1016165.1.
U.S. Appl. No. 12/588,461, filed Oct. 15, 2009; Inventor: Stevens et al.
Office Action mailed Feb. 21, 2012 in U.S. Appl. No. 12/588,459.
Combined Search and Examination Report, Jul. 27, 2012 in United Kingdom application No. GB1205846.7.
Office Action mailed Jan. 22, 2013, in U.S. Appl. No. 12/588,459.
U.S. Appl. No. 12/588,459, filed Oct. 15, 2009; Oterhals et al.
U.S. Appl. No. 12/923,518, filed Sep. 24, 2010, Oterhals et al.
M.J. Weinberger et al, "The LOCO-I Lossless Image Compression Algorithm: Principles and Standardization into JPEG-LS" 34 pages.
M. Ferretti et al, "A Parallel Pipelined Implementation of LOCO-I for JPEG-LS" IEEE 2004, 4 pages.
Intel Buffer Compression (http://virtuousgeek.org/blog) Jan. 2011, 5 pages.
Z. Ma et al, "Frame Buffer Compression for Low-Power Video Coding" 18$^{th}$ IEEE International Conference on Image Processing, 2011, pp. 757-760.
T.L.B. Yng et al, "Low Complexity, Lossless Frame Memory Compression Using Modified Hadamard Transform and Adaptive Golomb-Rice Coding" IADIS International Conference Computer Graphics and Visualization, 2008, pp. 89-96.
A.J. Penrose, "Extending Lossless Image Compression" University of Cambridge Computer laboratory Technical Report No. 526, Dec. 2001, 149 pages.
R.A. Patel et al, "Parallel Lossless Data Compression on the GPU" IEEE 2012, 10 pages.
Arctablet (http://www.arctablet.com/blog . . . ) 2010, 12 pages.
Final Office Action mailed Jul. 18, 2014 in co-pending U.S. Appl. No. 12/923,518.
Office Action mailed Jul. 22, 2014 in co-pending U.S. Appl. No. 12/588,461.
Bergsagel, Jonathan, et al., "Super high resolution displays empowered by the OMAP4470 mobile processor: WUXGA resolution tablets now becoming a reality for the Android ecosystem", Texas Instruments, Dallas, Texas, 2012, pp. 1-16.
Khan, Moinul H., et al., "Bandwidth-efficient Display Controller for Low Power Devices in Presence of Occlusion", Consumer Electronics, ICCE 2007, Digest of Technical Papers, International Conference on Jan. 10-14, 2007 (2 pages).
Park, Woo-Chan, et al., "Order Independent Transparency for Image Composition Parallel Rendering Machines", P.-C. Yew and J. Xue (Eds.): A CSA 2004, LNCS 3189, pp. 449-460.

Heade, T., et al., "HDR Image Composition and Tone Mapping on the Cell Processor", MSc Interactive Entertainment Technology, Trinity College Dublin, Graphic Vision and Visualisation GV2 group (8 pages).
"Quick look at the Texas Instruments TI OMAP 4470 CPU, Kindle Fire HD CPU", Arctablet News, 2014 Arctablet Blog, pp. 1-7.
"Composition Processing Cores (CPC)", http://www.vivantecorp.com/index.php/en/technology/composition.html.
U.S. Appl. No. 14/032,481, filed Sep. 20, 2013; Inventor; Croxford et al.
Office Action mailed Feb. 21, 2012 in U.S. Appl. No. 12/588,461, pp. 1-2.
Office Action mailed Aug. 29, 2012 in U.S. Appl. No. 12/588,459, pp. 1-29.
Office Action mailed Jun. 20, 2013 in U.S. Appl. No. 12/588,459, pp. 1-26.
Office Action mailed Jul. 2, 2013 in U.S. Appl. No. 12/588,459, pp. 1-24.
Office Action mailed Feb. 17, 2012 in U.S. Appl. No. 12/588,461, pp. 1-20.
Office Action mailed Aug. 30, 2012 in U.S. Appl. No. 12/588,461, pp. 1-22.
Shim, *Low-Power LCD Display Systems*, School of Computer Science and Engineering, Seoul National University, Korea.
Quick Look at the Texas Instruments TI OMAP 4470 CPU, Kindle Fire HD CPU, http://www.arctablet.com/blog/featured/quick-look-texas-instruments-ti-omap-4479-cpu; posted Sep. 6, 2012 in Archos Gen10 CPU TI OMAP TI OMAP 4470; 12 pages; Sep. 6, 2012.
U.S. Office Action issued in U.S. Appl. No. 12/588,461 dated Jul. 22, 2014.
Japanese Office Action issued in Japanese Patent Application No. 2010-213509 dated Jun. 23, 2014 (w/ translation)-7 pp.
Final Rejection mailed Feb. 24, 2015 in co-pending U.S. Appl. No. 12/588,461.
Non-final Rejection mailed Dec. 26, 2014 in co-pending U.S. Appl. No. 12/923,518.
Vesa Digital Packet Video Link Standard, Video Electronics Standards Association, Version 1, Apr. 18, 2004, 86 pages.
Japanese Office Action dated Apr. 7, 2014 in JP 2010-213508 and English translation.
Office Action mailed Apr. 2, 2015 in U.S. Appl. No. 13/435,733, 39 pages.
Notice of Allowance mailed Jul. 7, 2015 in co-pending U.S. Appl. No. 14/032,481 24 pages.
Final Office mailed Aug. 7, 2015 in co-pending U.S. Appl. No. 12/923,518 27 pages.
Final Office Action mailed Jan. 4, 2016 in co-pending U.S. Appl. No. 13/435,733 37 pages.

* cited by examiner

ADAPTIVE FRAME BUFFER COMPRESSION

This application is a continuation-in-part of U.S. patent application Ser. No. 12/588,461 filed 15 Oct. 2009, which claims priority to GB Application No. 0916924.4 filed 25 Sep. 2009, the content of which are incorporated herein in their entirety by reference.

BACKGROUND OF THE INVENTION

1. Field of the Invention

This invention relates to the field of data processing systems. More particularly, this invention relates to data processing systems which compress image data to be stored within a frame buffer and then decompress that image data in order to drive a display device.

2. Description of the Prior Art

It is known to provide data processing apparatus which generates image data, such as graphics data or video data, and then stores that data into a frame buffer. A display driver can then read the frame buffer and use the image data stored therein to drive a display device to display the desired image.

It is desirable that an apparatus for processing data using a frame buffer into which image data is stored should consume a reduced amount of power in its operation. Measures which can reduce power consumption are advantageous, such as in providing increased usage time when constrained by battery life in mobile devices.

SUMMARY OF THE INVENTION

Viewed from one aspect the present invention provides an apparatus for processing data comprising:

image data generating circuitry configured to generate image data for forming a sequence of image frames to be displayed;

a frame buffer;

compression circuitry configured to compress said image data in accordance with one or more compression control parameters to form frame-buffer image data and to write said frame-buffer image data to said frame buffer;

decompression circuitry configured to read said frame-buffer image data from said frame buffer and to decompress said frame-buffer image data in accordance with said one or more compression control parameters to provide said image data;

display driver circuitry configured to drive a display device using said image data provided by said decompression circuitry to display said sequence of image frames;

compression control circuitry configured:

(a) to determine if at least a portion of an image frame in successive image frames of said sequence of image frames is subject to less than a threshold amount of change for greater than a threshold time; and (b) if said portion is subject to less than said threshold amount of changed for greater than said threshold time, then to change said one or more compression control parameters used for said portion:

(i) to increase a compression ratio achieve for said portion;

(ii) to hold a degree of lossiness for said portion due substantially constant; and (iii) to increase energy consumed by said compression circuitry while compressing said portion and writing said portion to said frame buffer.

The present invention recognises and exploits the balance between a reduction in energy expended in writing and reading compressed image data from a frame buffer compared with the energy consumed in processing the associated frame buffer to reduce the quantity of image data which needs to be written to and read from the frame buffer. More particularly, if a portion, portions or the whole of an image frame is detected as being relatively static (such as unchanged or with a degree of change less than a threshold amount) for a period of time larger than a threshold time, then it is statistically likely that these conditions will persist for some time into the future and accordingly the energy extended in compressing the static portion, portions or whole of the image will be less than the energy saved by the reduced amount of data which will need to be at least read from the frame buffer in order to display that portion, portions or whole of the image. If an image is relatively rapidly changing, then expending extra energy more effectively compressing that image before writing it to the frame buffer may not be worthwhile as the reduction in energy due to reading and writing of the frame buffer will be less than the energy consumed in the extra compression since a change in the image will soon require that compression be performed again upon the changed version of the image.

In some embodiments, the threshold amount change may be finite with the frame-buffer image data stored within the frame buffer not being changed if the changes in the image are small. However, more normally, the frame-buffer image data will be changed whenever there is a change in the corresponding image data and accordingly the threshold amount of change in portion that trigger recompression and storage should be that the portion is unchanged.

Given that compression and decompression is applied to portions of the image which are subject to little or no change, the human eye is relatively sensitive to such portions of the image and accordingly in some embodiments the compression and decompression are respectively lossless compression and lossless decompression as this preserves the full quality of the image to which the eye is sensitive.

In some embodiments, the change in compression applied may be to switch from not compressing the image data when it is written into the frame buffer to a state in which the image data is subject to compression (e.g. lossless compression) when it is written into the frame buffer. In other embodiments, it may be that the image data is always subject to some degree of compression when it is written into the frame buffer, and it is the nature of that compression which is changed depending upon whether a portion is detected as having less than a threshold amount of change. For example, in a portion of the image which is relatively unchanging (static), it is worthwhile expending more energy in use of a more computationally intensive compression technique that will achieve a higher degree of compression as the data so compressed will likely remain unchanged and present within the frame buffer for a relatively long period thereby justifying the increased energy consumed in performing that more computationally intensive/expensive compression. Conversely, areas of the image which are subject to greater than a threshold amount change during a predetermined period will likely often need to be changed within the frame buffer and accordingly require a recompression operation to be performed such that the less computationally intensive/expensive compression technique will produce overall less energy consumption.

In some embodiments, the compression and decompression may be based upon compressing and decompressing blocks of image data (blocks of pixels) with a given block size. In this context, the use of larger blocks may produce a higher degree of compression, but is more computationally intensive and so requires more energy to perform. Accordingly, the changed to the one or more compression control parameters used when portions of the image which have less than a threshold amount change for greater than a threshold amount of time is that the block size is increased in order to increase the compression ratio while holding the degree of lossiness (i.e. lossless or the same degree of loss) substantially constant and increasing the energy consumed in the compression itself.

Increasing the block size has an advantage of allowing increased length burst data accesses when the external memory controller supports such burst data accesses. Longer burst data accesses typically consume less power and are also more efficient in terms of bandwidth utilisation.

It will be appreciated that the compression circuitry could take a wide variety of different forms. In particular, the compression circuitry could be implemented by software executing on a general purpose processor, by dedicated hardware or a hybrid therebetween. The same range of implementation options is also possible for the decompressions circuitry, but as this will generally be more closely associated with a particular display device and the function of serving as a display driver, it may be generally more efficient to use dedicated hardware that is programmed to respond to different compression control parameters as the decompression circuitry. Examples of such systems are described in US-A-2011/0102446 entitled "graphics processing systems" the content of which are incorporated herein in their entirety by reference.

Detection of whether or not portions of the image are changing may be achieved in a variety of different ways. In some embodiments, the compression control circuitry may be configured to compare signature values generated for correspondingly positioned blocks of image data within successive frames. The generation of the same signature value for the same block of image data (block of pixels) within an image upon successive frames is indicative that the block of image is unchanged. One particular form of signature value which may be used in this way is a hash value, such as a cyclic redundancy code (CRC) value.

A trade off arising when applying more sophisticated compression that achieves a higher compression ratio for static portions of the image is that it is typically harder to obtain access to random points within those portions of the image in order to update the image stored in the frame buffer e.g. if larger blocks are used, then the whole of a block must be changed in order to only change a small portion of that block thereby favouring the use of smaller blocks when changes are frequent. In order to at least partially address this issue, in some embodiments, the frame buffer continues to store as a static portion the frame-buffer image data for that portion which has now been subject to a higher degree of compression. The availability of the static portion within the frame buffer permits this static portion to be reactivated and put back into use when it is desired to update the portion of the image without having to reform that static portion with an associated time and energy penalty.

While it will be appreciated that the changes in compression control parameters could influence a large number of factors concerning the compression used (e.g. whether or not compression was used at all, block size, the sophistication of the algorithm applied, etc) in some embodiments the change triggered by the change in one or more control parameters switches from a single-pass compression algorithm to use of a multi-pass compression algorithm.

A more computationally intensive compression operation will typically take longer to perform than one which is less computationally intensive. In order to accommodate this situation, in some embodiments the writing of the frame-buffer image data to the frame buffer may take place over a period of time extending over a plurality of reads of the frame buffer memory by the decompression circuitry. A less computationally intensive compression applied may permit the full update of the frame-buffer image data to be performed in a time period between adjacent reads of the frame buffer by the decompression circuitry.

In some embodiments, the change in compression control parameters may serve to change the way in which the data is stored within the frame buffer. More particularly, this may be switched from storing the frame-buffer image data for different blocks in a form with some deadspace between the blocks, which permits separate random access to those blocks and space for modified and recompressed or decompressed data, to a storage technique in which the blocks of image data are stored as a chain of blocks without deadspace therebetween, thereby preventing separate random access to the blocks. Decreasing the amount of storage space occupied decreases energy used for external memory read/write.

In some embodiments, the decompression circuitry is responsive to the change in one or more compression control parameters for a portion of the frame buffer image data to read that frame-buffer image data from different areas within the memory containing the frame buffer and to apply different compression algorithms to the frame-buffer image data when performing its decompression.

In some embodiments, the one or more compression control parameters may trigger the control circuitry to reorder the image data when filtering the frame-buffer data. The reordering in this way will consume energy and time, but may be used to place the frame-buffer image data into an order that matches an order in which the decompression circuitry will read the frame-buffer image data from the frame buffer thereby permitting longer burst length read accesses to the frame buffer by the decompression circuitry. Longer burst length read accesses are more energy efficient and accordingly providing the portion of the image which is subject to this reordering remains unchanged for a reasonable amount of time, then the energy consumed in the reordering operation will be outweighed by the energy saved by permitting longer burst length read accesses.

Viewed from another aspect the invention provides an apparatus for processing data comprising:
  image data generating means for generating image data for forming a sequence of image frames to be displayed;
  frame buffer means for storing a frame;
  compression means for compressing said image data in accordance with one or more compression control parameters to form frame-buffer image data and for writing said frame-buffer image data to said frame buffer means;
  decompression means for reading said frame-buffer image data from said frame buffer means and for decompressing said frame-buffer image data in accordance with said one or more compression control parameters to provide said image data;
  display driver means for driving display means for displaying using said image data provided by said decompression means to display said sequence of image frames;
  compression control means for:
  (a) determining if at least a portion of an image frame in successive image frames of said sequence of image frames is subject to less than a threshold amount of change for greater than a threshold time; and (b) if said portion is subject to less than said threshold amount of changed for greater than said threshold time, then changing said one or more compression control parameters used for said portion:

(i) to increase a compression ratio achieve for said portion;

(ii) to hold a degree of lossiness for said portion substantially constant; and (iii) to increase energy consumed by said compression circuitry while compressing said portion and writing said portion to said frame buffer.

Viewed from a further aspect the present invention provides a method of processing data comprising the steps of:

generating image data for forming a sequence of image frames to be displayed;

compressing said image data in accordance with one or more compression control parameters to form frame-buffer image data;

writing said frame-buffer image data to a frame buffer;

reading said frame-buffer image data from said frame buffer means;

decompressing said frame-buffer image data in accordance with said one or more compression control parameters to provide said image data;

driving a display device using said image data provided by said step of decompressing to display said sequence of image frames;

determining if at least a portion of an image frame in successive image frames of said sequence of image frames is subject to less than a threshold amount of change for greater than a threshold time; and if said portion is subject to less than said threshold amount of changed for greater than said threshold time, then changing said one or more compression control parameters used for said portion:

(i) to increase a compression ratio achieve for said portion;

(ii) to hold a degree of lossiness for said portion substantially constant; and (iii) to increase energy consumed by said compression circuitry while compressing said portion and writing said portion to said frame buffer.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF THE EMBODIMENTS

Figure 1:
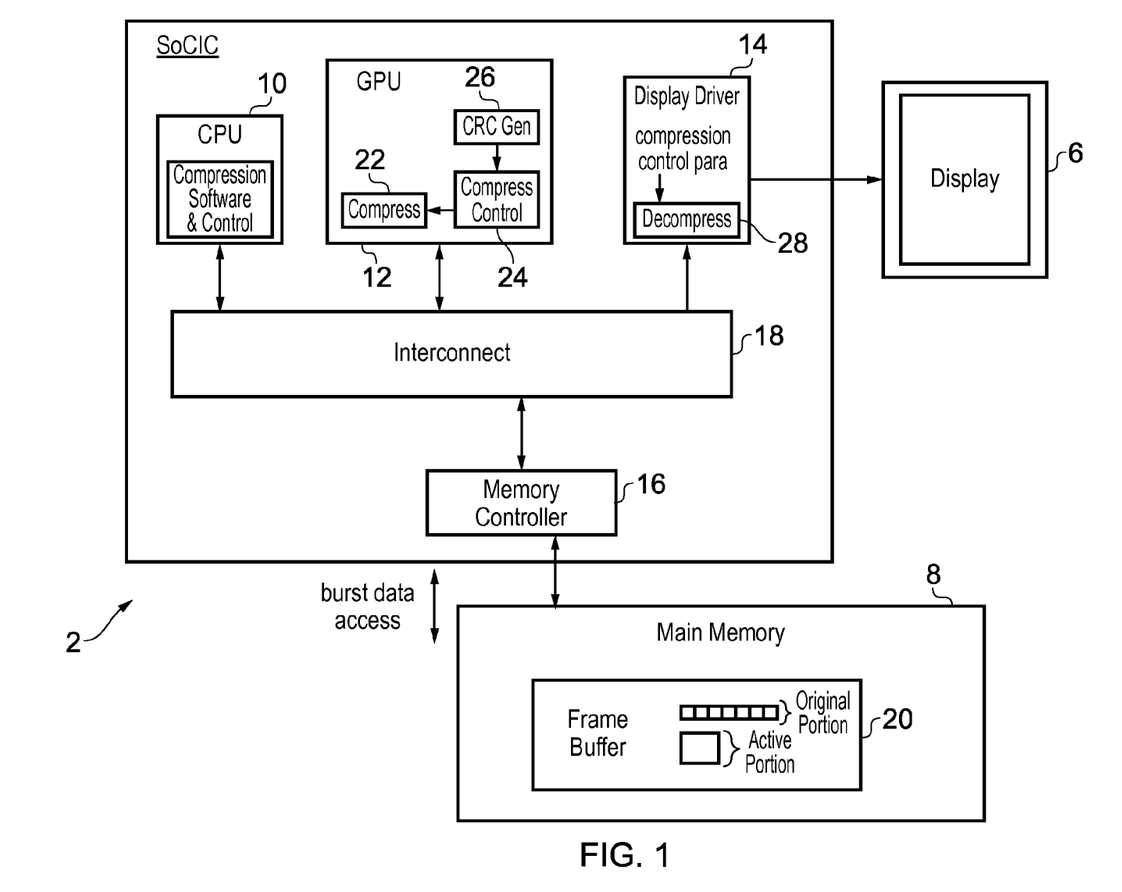
FIG. 1 schematically illustrates a data processing system applying compression and decompression to image data stored within an image frame buffer.

FIG. 1 schematically illustrates a data processing system 2 including a system-on-chip integrated circuit 4, a display 6 and an external main memory 8. The system-on-chip integrated circuit 4 includes a general purpose processor 10, a graphics processing unit 12, a display driver 14 and a memory controller 16 all communicating via interconnect circuitry 18. The main memory 8 includes a portion which serves as a frame buffer 20. The memory controller 6 supports burst data accesses between the system-on-chip integrated circuit 4 and the main memory 8, including the frame buffer 20. These burst data accesses may be burst read access and/or burst write accesses.

In operation, one or both of the general purpose processor 10 and the graphics processing unit 12 generate image data for forming an image to be displayed on the display 6 via the display driver 14. The image data formed is, in this example embodiment, subject to one of two forms of compression processing by the respective one of the general purpose processor 10 or the graphics processing unit 12 which generates that image data. The compressed image data so formed serves as frame-buffer image data which is stored via the interconnect circuitry 18 and the memory controller 16 into the frame buffer 20. The general purpose processor 10 may use compression software and software control of that compression to form the frame-buffer image data. Conversely, the graphics processing unit 12 may use dedicated compression hardware 22 operating under control of dedicated compression control hardware 24 to compress the image data and form the frame-buffer image data. The graphics processing unit 12 also includes CRC generating circuitry 26 which serves to perform processing to generate a signature value (e.g. hash value), in the form of a cyclic redundancy code value, for each block of image data generated by the graphics processing unit. These CRC values generated can be compared for each successive block of image data corresponding to the same position in the overall image so as to determine whether that block of image data is static, i.e. is subject to less than a threshold amount of change for greater than a threshold time. The same type of processing may also be performed within the general purpose processor 10 under software control. In this case, the general purpose processor 10 operating under such software control will effectively provide compression circuitry, decompression circuitry and compression control circuitry, rather than these being formed by dedicated special purpose hardware.

The display driver 14 includes decompression circuitry 28 in the form of dedicated hardware controlled by compression control parameters, such that the decompression circuitry 28 performs a decompression operation matching the compression operation which was applied to the frame-buffer image data prior to it being written to the frame buffer 20. The compression control parameters may be, for example, read from header data for the frame-buffer image data stored within the frame buffer 20, or may, in other embodiments, be directly supplied to the decompression circuitry 28 from one or both of the general purpose processor 10 and the graphics processing unit 12. In the example embodiment illustrated, the change in compression control parameters applied depending upon whether or not a portion of the image data is detected as being static (subject to less than a threshold amount of change for greater than a threshold time) is to change the block size used in compressing that portion of the image. A larger block size will normally achieve a higher degree of compression, but will be computationally more intensive and accordingly require more energy to perform. The compression will also be slower. This slower compression may require the update to the frame buffer 20 to be performed over a period of time extending over multiple read periods of the frame buffer 20 by the display driver 14, i.e. the display driver 14 will read the frame buffer memory 20 more than once during a relatively slow update operation of the frame buffer memory 20 performed by the compression circuitry 10, 22 when applying a high degree of compression.

The change(s) in compression performed in dependence upon one or more compression control parameters may take many other forms. In some embodiments, the change may be to switch from between performing no compression and to performing compression. Other changes may be to switch from performing single-pass compression to multi-pass compression.

The compression applied by the general purpose processor 10 under software control, or by the compression circuitry 22 within the GPU 12, may be lossless compression using either large blocks or small blocks. In either case, the degree of lossiness will be unchanged as both are lossless. However, in other embodiments, the compression applied may be lossy and the change in control parameters will be made such that the degree of lossiness is substantially unchanged as the aim of the technique is to vary the degree of compression achieved balanced against the energy consumed in achieving that compression.

Another possible variation in the processing performed by the general purpose processor 10 in generating the frame-buffer image data, and the compression circuitry 22 in generating the frame-buffer image data, is to reorder the frame-buffer image data into a form which more effectively supports burst read data accesses to that frame-buffer image data by the decompression circuitry 28. This will be described further below in relation to FIG. 7. A further variation in the processing performed may be a change in the compression algorithm used between the static and the changing portion, e.g. a change between different MPEG algorithms.

As illustrated in FIG. 1, the frame buffer 20 may store an active portion and an original portion. When a change in the one or more compression control parameters is made so as to increase the degree of compression achieved, then the previously stored frame-buffer image data for that portion is permitted to remain within the frame buffer 20 as an original portion. A new active portion of frame-buffer image data is stored within the frame buffer 20 using the change one or more compression control parameters and is read by the decompression circuitry 28 when seeking to generate the image to drive the display 6. However, the original portion will typically have characteristics which allow it to more efficiently support changes/updates to represent changes in the underlying image data. Thus, when the portion of the image identified as static ceases to be static, then the changes in frame-buffer image data needed to reflect the change which has been made within that portion may be more efficiently made by changing the original portion which continues to be stored in the frame buffer 20. Thus, the original portion will be reactivated and updated (by being read, decompressed, modified and recompressed by one of the general purpose processor 10 under software control of the compression circuitry (22) (which may also decompress)) and thereafter the decompression circuitry 28 will continue to read that original portion until it has remained static for greater than a threshold period of time where a new active portion will be formed using the changed compression control parameters. When changing from reading the original portion to reading the active portion, the decompression circuitry 28 serves to change the area within the memory 8 which it reads. Furthermore, it also changes the compression algorithm it applies to reflect the smaller block size associated with the reactivated static portion.

Figure 2:
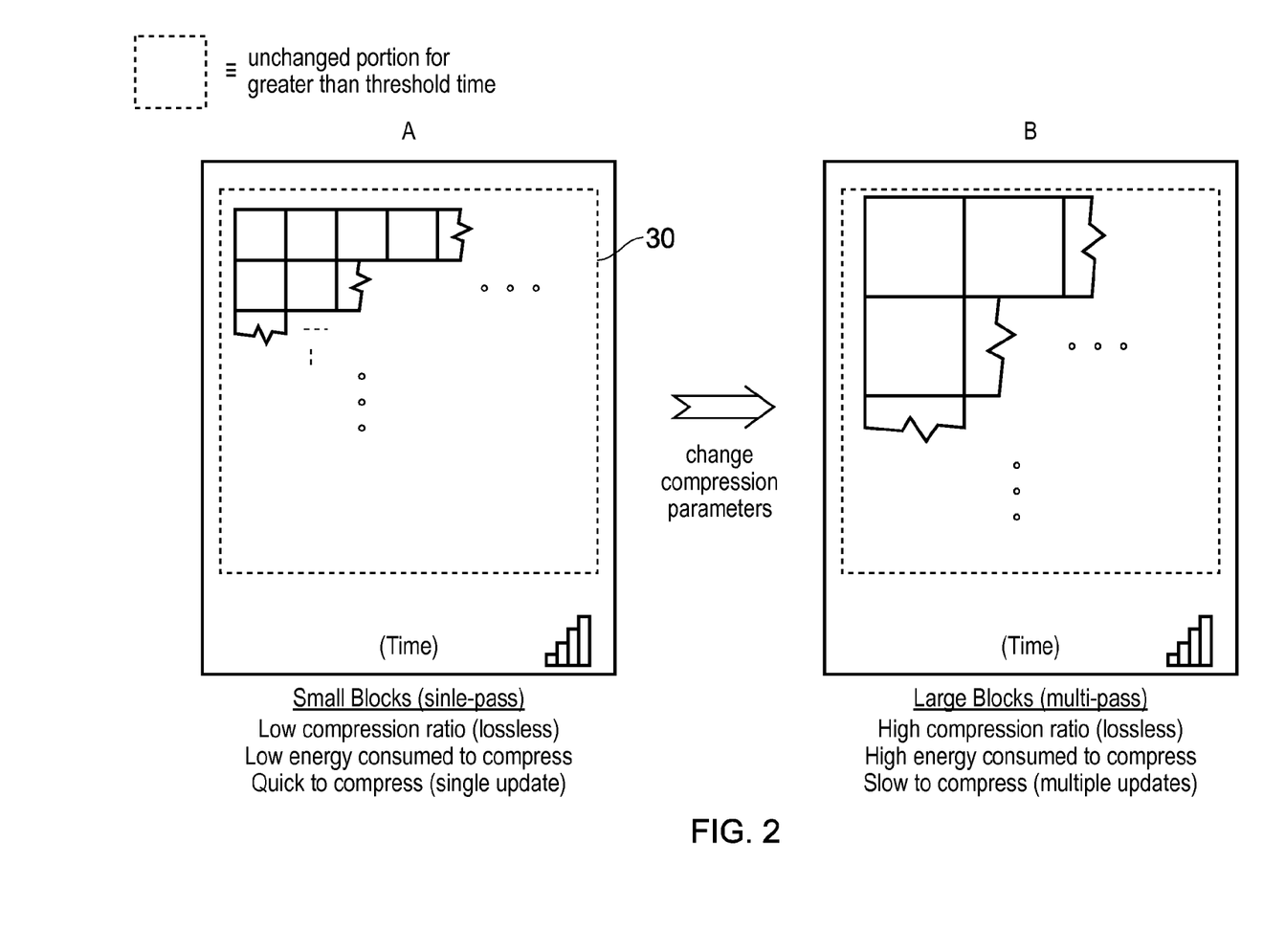
FIG. 2 schematically illustrates an effect of a change in compression parameters applied to a portion of the image data.

FIG. 2 schematically illustrates example changes in compression characteristics which may be achieved by changing the compression parameters. Image A is detected as containing a static portion 30. The portions of the image A containing a time display and a wireless signal reception strength display will typically not be static as they are subject to regular change. However, the static portion 30 may correspond to the user interface display portion of, for example, a mobile telephone and this may typically change relatively infrequently. In image A, the static portion has been subject to compression using small blocks. The change in compression parameters includes changing the block size so that larger blocks are used. It is also possible that the compression may change from being single-pass compression to multi-pass compression in some embodiments. Further changes in compression characteristics may also be achieved by the changing compression parameters. All of these variations are included within the present techniques.

Characteristic of the compression using small blocks are that it has a relatively low compression ratio (lossless), consumes a relatively low quantity of energy to perform and is relatively quick to perform. An advantage of small block sizes is that for random accesses, data can be accessed more easily. Small block sizes allow easier modification, as less data need be fetched, decoded, modified and recompressed. Conversely, characteristics of compression using large blocks are that it achieves a high compression ratio (lossless), consumes a relatively high amount of energy to perform and is relatively slow to complete.

The higher compression ratio achieved by the use of large blocks will justify the additional energy consumed in performing that compression providing that the data so compressed remains unchanged for a period of time sufficient that the energy savings achieved by multiple readings of a lower volume of more compressed data from the frame buffer 20 outweigh the extra energy needed to achieve that higher degree of compression.

Figure 3:
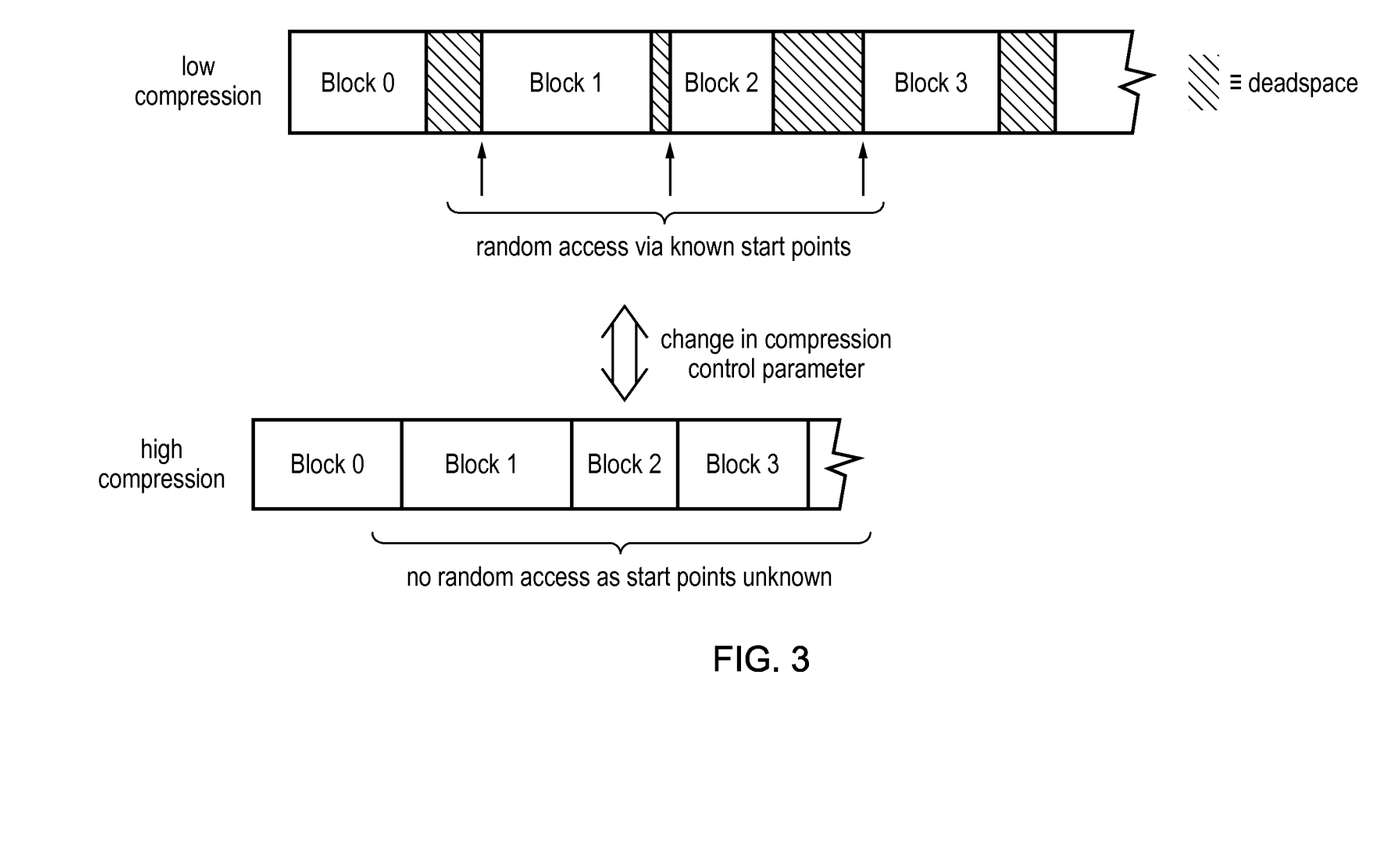
FIG. 3 schematically illustrates the storage of blocks of compressed image data both with and without deadspace provided between the blocks.

FIG. 3 schematically illustrates a further way in which compression characteristics may vary. Blocks of compressed data which are changed relatively frequently are preferentially provided with a random access capability such that the individual blocks of data can be separately accessed and updated. Thus, if a small portion of the image is changed, then only the block of compressed data corresponding to that small portion of the image need be accessed and updated. However, in order to support such separate random access to small blocks of compressed data, it may be necessary to include deadspace between the blocks such that each of the compressed blocks of data starts at a known position. As the different blocks of data will have unknown sizes (the degree of compression agreed cannot be predicted with complete accuracy in advance), the deadspace is necessary in order to provide a buffer so that fixed start points for the separate blocks may be provided. The deadspace provides space if a decoded, modified and recompressed block is larger than the original.

In contrast to the above, if the portion of the image represented by the compressed blocks of data does not change frequently, then random access to those separate blocks of data will not be so significant and accordingly the benefit achieved by removing the deadspace in terms of a high degree of compression will out way the loss of the ability to separately provide random access to individual small blocks of compressed data.

Figure 4:
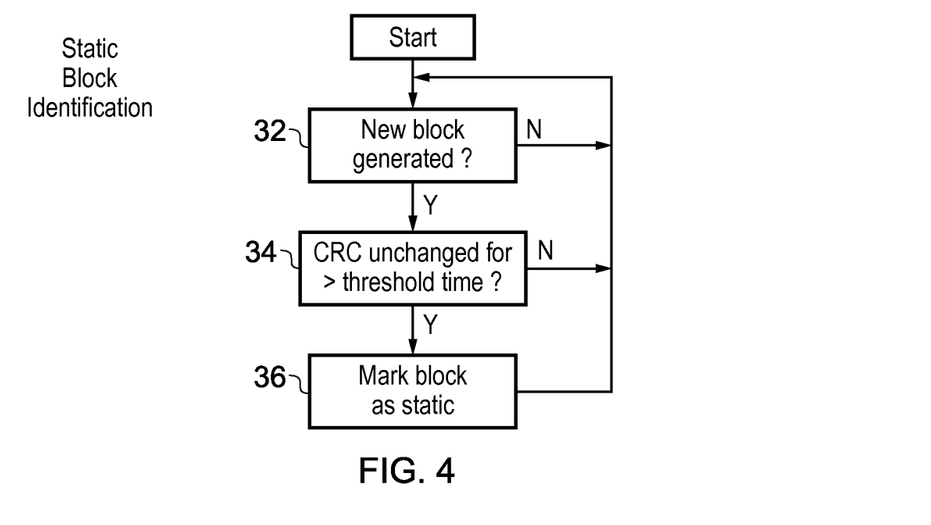
FIG. 4 is a flow diagram schematically illustrating static block identification.

FIG. 4 is a flow diagram schematically illustrating how blocks of image data may be identified as static blocks. Step 32 waits for a new block to be generated. Step 34 then determines whether the cyclic redundancy code value for that new block as generated by the CRC generation circuitry 26 has remained unchanged compared with previous versions of that block for greater than a threshold time. If the CRC value has so remained unchanged, then the block concerned is marked at static at step 36, otherwise the block is not marked as static.

Figure 5:
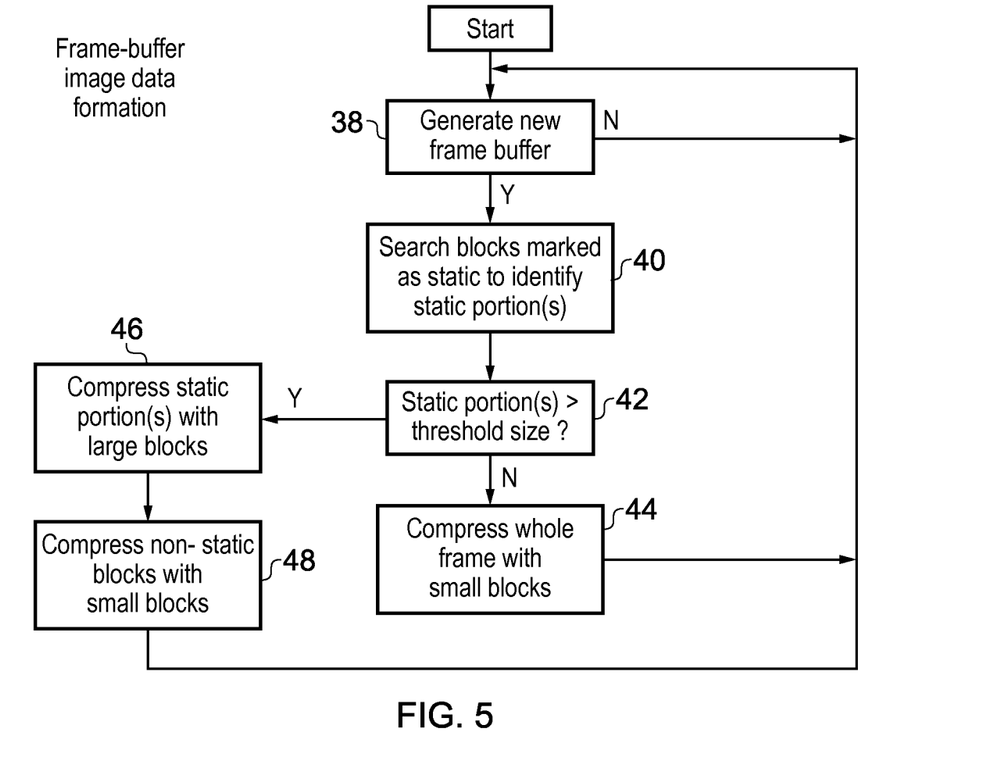
FIG. 5 is a flow diagram schematically illustrating frame-buffer image data formation.

FIG. 5 is a flow diagram schematically illustrating frame-buffer image data formation. This flow diagram assumes that the blocks of data which will be used to form the frame-buffer image data have already been generated and have been marked as static or not static by the processing of FIG. 4. At step 38, the processing waits until a time is reached at which the frame buffer 20 is to be refreshed, e.g. the GPU has been provided with new data by a driver/application and so generates a new frame. At step 40, the blocks of image data generated and marked in the processing of FIG. 4 are searched to identify static portions or portions, i.e. contiguous areas of blocks which are marked as static. Step 42 then determines whether or not the static portion or portions identified in step 40 are greater than a threshold size. If the static portions are too small, or there are no static portions, then it is not worthwhile to adopt large block compression and processing proceeds to step 44 where the whole frame is compressed using small block compression. Conversely, if one or more portions of the image to be compressed are identified as static portions with greater than a threshold size (e.g. multiple neighbouring unchanging regions (blocks) that can be combined together to form large blocks), then the use of large block compression for those portions is justified. Step 46 serves to compress the static portions identified at step 42 with large block compression and step 48 serves to compress the remaining blocks (non-static blocks) with small block compression. A header for the frame-buffer image data stored within the frame memory 20 is written to include data specifying which portions of the frame-buffer image data formed are compressed using large blocks, which are compressed using small blocks and the memory address locations for those different data.

Figure 6:
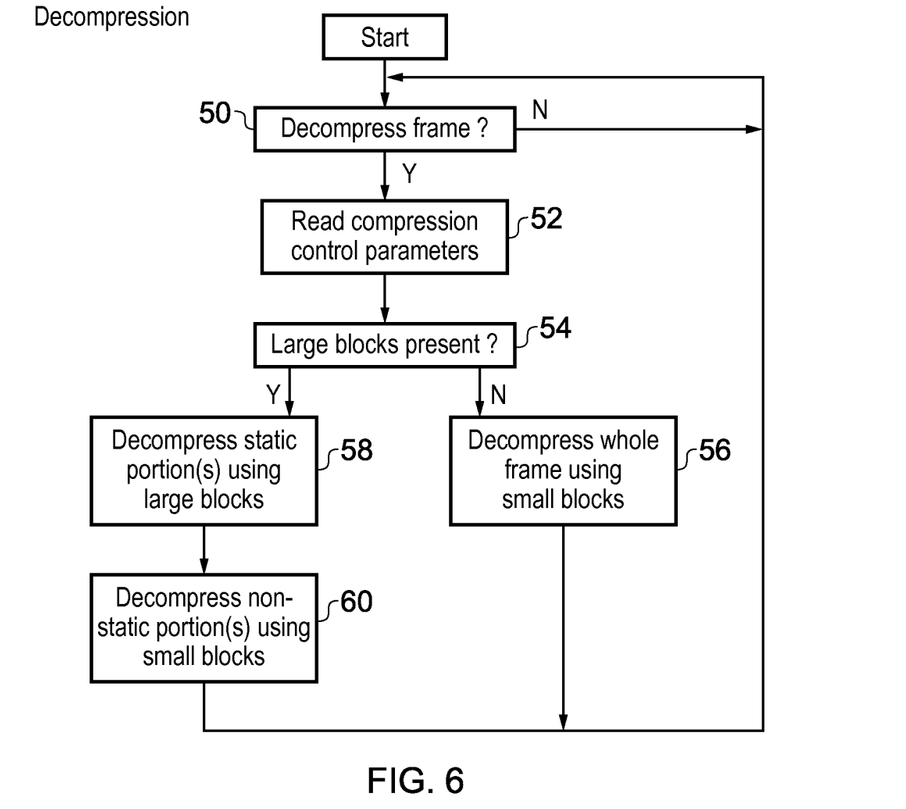
FIG. 6 is a flow diagram schematically illustrating decompression processing.

FIG. 6 is a flow diagram schematically illustrating decompression performed by the decompression circuitry 28. At step 50, processing waits until it is time to decompress a frame. Step 52 then reads the compression control parameters from the header of the frame-buffer image data. Step 54 determines from this header data whether large block compression has been used. If no large block compression has been used, then step 56 serves to decompress the whole frame using small blocks. If large blocks are present, then step 58 decompresses those large blocks to form the static portions which were compressed using large blocks. Step 60 then decompresses the non-static portions using small blocks.

Figure 7:
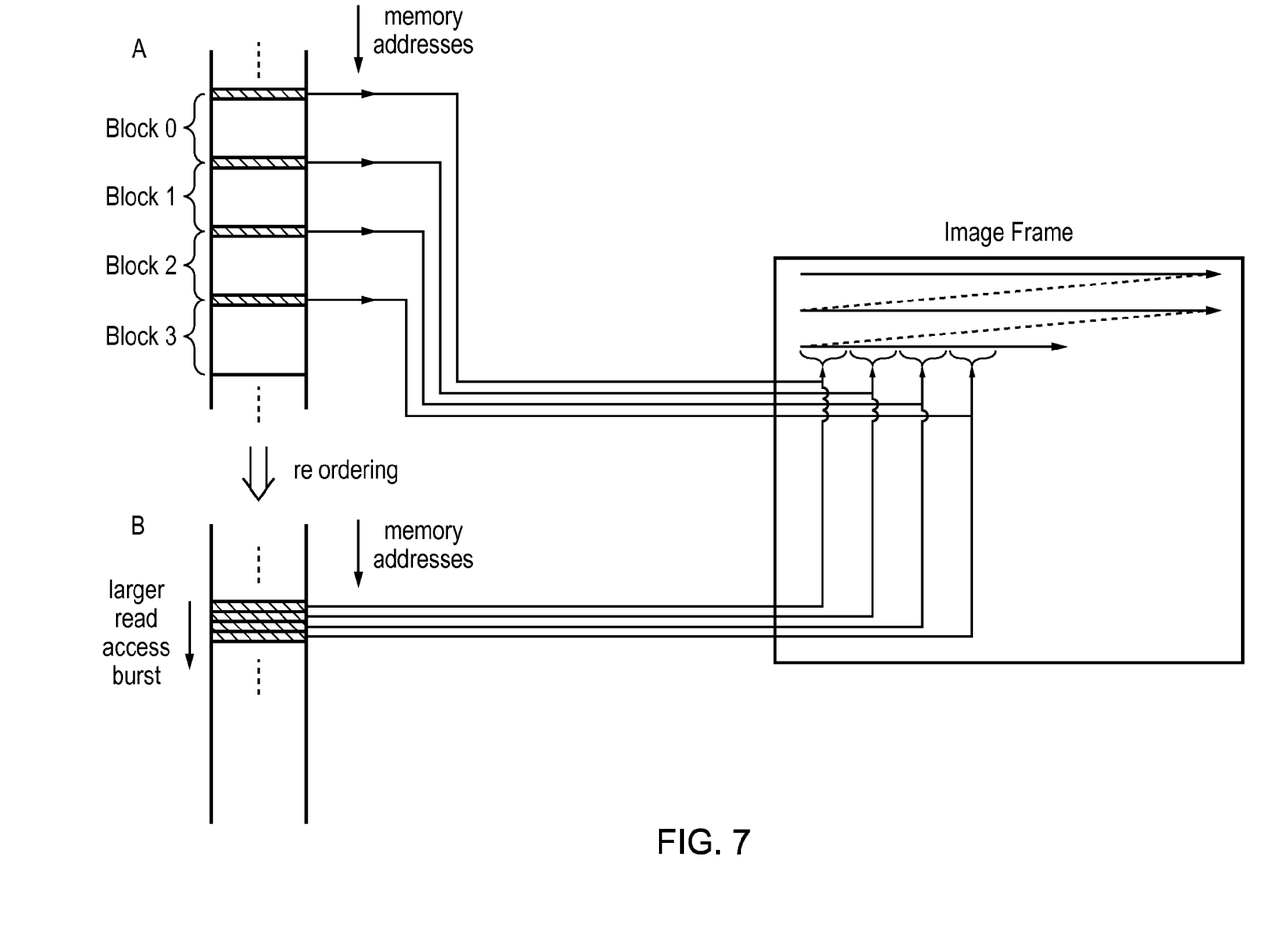
FIG. 7 is a diagram schematically illustrating the reordering of frame-buffer image data in order to permit larger read access bursts during decompression.

FIG. 7 schematically illustrates the effect of changing the data ordering between the image data and the frame-buffer image data. Changing the ordering is another example of a processing charge that can be made in response to a change in the compression control parameters. This change can be made in addition to and/or instead of the change in block sizes. The decompression circuitry 28 may be configured to generate the image data for driving the display 6 in a raster scan pattern. When the frame-buffer image data is stored within the frame memory 20 on a block-by-block basis without reordering, such a raster scan read pattern may result in a plurality of separate relatively small portions of the memory being read as illustrated in part A of FIG. 7. Conversely, if when the frame-buffer image data is stored into the frame buffer 20 it is subject to a reordering such that the portions of the frame-buffer image data that will be read out in raster scan order are stored next to each other within the frame buffer 20, then a larger read access burst will be permitted. This is the situation illustrated in part B of FIG. 7; larger read access burst are more efficient. This technique changes the ordering to one more suitable for the display controller, but at the expense of making it more difficult to randomly access or modify portions of the frame.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   image data generating circuitry configured to generate image data for forming a sequence of image frames to be displayed;
   a frame buffer;
   compression circuitry configured to compress said image data in accordance with one or more compression control parameters to form frame-buffer image data and to write said frame-buffer image data to said frame buffer;
   decompression circuitry configured to read said frame-buffer image data from said frame buffer and to decompress said frame-buffer image data in accordance with said one or more compression control parameters to provide said image data;
   display driver circuitry configured to drive a display device using said image data provided by said decompression circuitry to display said sequence of image frames;
   compression control circuitry configured:
   (a) to determine if at least a portion of an image frame in successive image frames of said sequence of image frames is subject to less than a threshold amount of change for greater than a threshold time; and
   (b) if said portion is subject to less than said threshold amount of change for greater than said threshold time, then to change said one or more compression control parameters used for said portion:
      (i) to decrease energy consumed by said decompression circuitry while reading said portion from said frame buffer;
      (ii) to hold a degree of lossiness for said portion due substantially constant; and
      (iii) to increase energy consumed by said compression circuitry while compressing said portion and writing said portion to said frame buffer.

2. Apparatus as claimed in claim 1, wherein said change of said one or more compression control parameters controls said compression circuitry to increase a compression ratio for said portion.

3. Apparatus as claimed in claim 1, wherein said threshold amount of change in said portion is that said portion is unchanged.

4. Apparatus as claimed in claim 1, wherein said compression and said decompression are respectively lossless compression and lossless decompression.

5. Apparatus as claimed in claim 1, wherein said change of said one or more compression control parameters switches said compression circuitry from applying no compression to said image data such that said frame-buffer image data is uncompressed image data to applying compression to said image data such that said frame-buffer image data is compressed image data.

6. Apparatus as claimed in claim 1, wherein said change of said one or more compression control parameters switches said compression circuitry from
   (i) applying compression to said image data with a first set of compression characteristics, such that said frame-buffer image data is first compressed image data, to
   (ii) applying compression to said image data with a second set of characteristics, such that said frame-buffer image data is second compressed image data.

7. Apparatus as claimed in claim 1, wherein said threshold time has a duration selected such that on average said portion will continue to be subject to less than said threshold amount of change for a continued period such that said increase in energy consumed by said compression circuitry is less than a decrease in energy consumed by said decompression circuitry while reading said portion from said frame buffer and decompressing said portion during said continued period.

8. Apparatus as claimed in claim 1, wherein
   said compression and said decompression are block based and said one or more compression control parameters include a size of blocks into which said image data is divided for said compression and said decompression, and
   said change to said one or more compression control parameters includes increasing said size of blocks, larger blocks resulting in a higher compression ratio, but an increase in energy consumed in said compression.

9. Apparatus as claimed in claim 8, wherein access to said frame buffer by said compression circuitry and said decompression circuitry is by burst data accesses.

10. Apparatus as claimed in claim 1, wherein said compression circuitry is formed by at least one of:
    a programmable processor executing a software based compression algorithm; and
    compression hardware.

11. Apparatus as claimed in claim 1, wherein said compression control circuitry is configured to compare signature values generated for a block of image data within successive frames to determine if less than said threshold amount of change has occurred within said block between said successive frame.

12. Apparatus as claimed in claim 11, wherein said signature value is a cyclic redundancy code value.

13. Apparatus as claimed in claim 1, wherein said frame buffer is configured to continue to store as an original portion said frame-buffer image data for said portion formed with said one or more compression control parameters prior to said change such that said original portion remains available if needed.

14. Apparatus as claimed in claim 13, wherein if said compression control circuitry detects that said portion is subject to more than said threshold amount of change, then said changes to said one or more control parameters are reversed and said original portion is reactivated and updated.

15. Apparatus as claimed in claim 1, wherein said change to said one or more compression control parameters includes a change from use of a single-pass compression algorithm to use of a multi-pass compression algorithm.

16. Apparatus as claimed in claim 1, wherein said change to said one or more compression control parameter includes a change in compression algorithm used.

17. Apparatus as claimed in claim 1, wherein said change to said one or more compression control parameters slows a rate at which said compression circuitry generates said frame-buffer image data and said compression circuitry is configured to write said frame-buffer image data for said portion generated after said change to said one or more compression control parameters as a sequence of updates to said frame buffer extending over a plurality of reads of said frame buffer by said decompression circuitry.

18. Apparatus as claimed in claim 1, wherein said change in said one or more compression control parameters switches from (a) storing said frame-buffer image data generated for respective blocks of image data as separate frame-buffer image data blocks with deadspace there between thereby permitting separate random access to said frame-buffer image data blocks to (b) storing said frame-buffer image data generated for respective blocks of image data as a chain of frame-buffer image data blocks without deadspace therebetween thereby preventing separate random access to said frame-buffer image data blocks.

19. Apparatus as claimed in claim 1, wherein said decompression circuitry is responsive to said change in said one or more compression control parameters for said portion to read frame-buffer image data for said portion from a different area within a memory containing said frame buffer and to apply a different compression algorithm to said frame-buffer image data for said portion.

20. Apparatus as claimed in claim 1, wherein said change to said one or more compression control parameters triggers said compression circuitry to reorder said image data to form said frame-buffer image data so as to match an order in which said decompression circuitry reads said frame-buffer image data from said frame buffer thereby permitting longer burst length read accesses to said frame buffer by said decompression circuitry.

21. Apparatus for processing data comprising:
    means for generating image data for forming a sequence of image frames to be displayed;
    means for storing a frame;
    means for compressing said image data in accordance with one or more compression control parameters to form frame-buffer image data and for writing said frame-buffer image data to said means for storing a frame;
    means for reading said frame-buffer image data from said means for storing a frame and for decompressing said frame-buffer image data in accordance with said one or more compression control parameters to provide said image data;
    means for driving means for displaying using said image data provided by said means for decompressing to display said sequence of image frames;
    means for:
      (a) determining if at least a portion of an image frame in successive image frames of said sequence of image frames is subject to less than a threshold amount of change for greater than a threshold time; and
      (b) if said portion is subject to less than said threshold amount of change for greater than said threshold time, then changing said one or more compression control parameters used for said portion:
         (i) to decrease energy consumed by said decompression circuitry while reading said portion from said means for storing a frame;
         (ii) to hold a degree of lossiness for said portion substantially constant; and
         (iii) to increase energy consumed by said compression circuitry while compressing said portion and writing said portion to said means for storing a frame.

22. A method of processing data comprising the steps of:
generating image data for forming a sequence of image frames to be displayed;
compressing said image data in accordance with one or more compression control parameters to form frame-buffer image data;
writing said frame-buffer image data to a frame buffer;
reading said frame-buffer image data from said frame buffer means;
decompressing said frame-buffer image data in accordance with said one or more compression control parameters to provide said image data;
driving a display device using said image data provided by said step of decompressing to display said sequence of image frames;
determining if at least a portion of an image frame in successive image frames of said sequence of image frames is subject to less than a threshold amount of change for greater than a threshold time; and
if said portion is subject to less than said threshold amount of change for greater than said threshold time, then changing said one or more compression control parameters used for said portion:
(i) to decrease energy consumed by said decompression circuitry while reading said portion from said frame buffer;
(ii) to hold a degree of lossiness for said portion substantially constant; and
(iii) to increase energy consumed by said compression circuitry while compressing said portion and writing said portion to said frame buffer.

* * * * *